(12) United States Patent
Shi et al.

(10) Patent No.: US 11,171,769 B2
(45) Date of Patent: Nov. 9, 2021

(54) TIME SYNCHRONIZATION METHOD, APPARATUS, AND SYSTEM

(71) Applicant: HUAWEI TECHNOLOGIES CO., LTD., Shenzhen (CN)

(72) Inventors: Xingjian Shi, Beijing (CN); Jinhui Wang, Dongguan (CN); Chuan Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/914,453

(22) Filed: Jun. 28, 2020

(65) Prior Publication Data

US 2020/0328872 A1    Oct. 15, 2020

Related U.S. Application Data

(63) Continuation of application No. PCT/CN2017/120075, filed on Dec. 29, 2017.

(51) Int. Cl.
*H04B 10/69* (2013.01)
*H04L 7/00* (2006.01)
(Continued)

(52) U.S. Cl.
CPC ............ *H04L 7/0075* (2013.01); *H04L 69/28* (2013.01); *H04Q 11/0005* (2013.01);
(Continued)

(58) Field of Classification Search
CPC ... H04L 7/0075; H04L 69/28; H04Q 11/0005; H04Q 2011/0045; H04J 3/0641;
(Continued)

(56) References Cited

U.S. PATENT DOCUMENTS

| | | | | |
|---|---|---|---|---|
| 4,590,473 A | * | 5/1986 | Burke | H04W 88/026 340/9.11 |
| 6,469,649 B1 | * | 10/2002 | Helkey | H03M 1/1245 341/143 |

(Continued)

FOREIGN PATENT DOCUMENTS

| | | |
|---|---|---|
| CN | 101288258 A | 10/2008 |
| CN | 102130735 A | 7/2011 |

(Continued)

OTHER PUBLICATIONS

IEEE 1588 V2,IEEE Std 15887""-2008 (Revision of IEEE Std 1588-2002),IEEE Standard for a Precision Clock Synchronization Protocol for Networked Measurement and Control Systems,IEEE Instrumentation and Measurement Society,Technical Committee on Sensor Technology (TC-9),dated Jul. 24, 2008,total 289 pages.

(Continued)

*Primary Examiner* — Dibson J Sanchez
(74) *Attorney, Agent, or Firm* — Maier & Maier. PLLC

(57) ABSTRACT

In various embodiments, a method is provided. In this method, a first signal is received from a master node, and is sampled to obtain a first sample. The first sample is then quantized to obtain a quantized form of the first sample. A first synchronization sequence is detected from the quantized form of the first sample at T2. First information is received from the master node and the first information is used to indicate a moment T1 at which the master node sends the first synchronization sequence. A second synchronization sequence is sent to the master node at T3. Second information received from the master node and the second information is used to indicate a moment T4 at which the master node detects a quantized form of the second synchronization sequence. Time synchronization is performed based on T1, T2, T3, and T4.

18 Claims, 9 Drawing Sheets

(51) Int. Cl.
*H04L 29/06* (2006.01)
*H04Q 11/00* (2006.01)
H04B 10/40 (2013.01)
H04B 10/079 (2013.01)

(52) U.S. Cl.
CPC ............ *H04B 10/079* (2013.01); *H04B 10/40* (2013.01); *H04B 10/69* (2013.01); *H04Q 2011/0045* (2013.01)

(58) Field of Classification Search
CPC ........ H04J 3/0667; H04J 3/1658; H04J 3/065; H04J 3/0691; H04J 3/0685; H04B 10/079; H04B 10/69; H04B 10/40
USPC ................... 398/43–103, 140–172, 202–214
See application file for complete search history.

(56) References Cited

U.S. PATENT DOCUMENTS

| | | | | |
|---|---|---|---|---|
| 8,225,128 | B2* | 7/2012 | Blixt | G06F 1/14 713/502 |
| 8,842,571 | B1* | 9/2014 | Yu | H04L 25/26 370/252 |
| 10,158,444 | B1* | 12/2018 | Darras | H04J 3/0682 |
| 2001/0046289 | A1 | 11/2001 | Robinson et al. | |
| 2002/0004400 | A1* | 1/2002 | Fischer | H04L 27/0012 455/456.5 |
| 2004/0097249 | A1 | 5/2004 | Manohar | |
| 2007/0266119 | A1 | 11/2007 | Ohly | |
| 2008/0181114 | A1 | 7/2008 | Fourcand | |
| 2009/0046792 | A1* | 2/2009 | Xu | H04L 25/025 375/260 |
| 2010/0260207 | A1* | 10/2010 | Simmons | G01S 5/14 370/503 |
| 2011/0035511 | A1* | 2/2011 | Biederman | H04J 3/0667 709/248 |
| 2012/0275501 | A1* | 11/2012 | Rotenstein | H04J 3/0667 375/220 |
| 2015/0063375 | A1* | 3/2015 | Tzeng | H04J 3/0667 370/512 |
| 2015/0117251 | A1 | 4/2015 | Lien | |
| 2017/0180111 | A1 | 6/2017 | Lanzone et al. | |
| 2018/0138993 | A1* | 5/2018 | Kuchler | G01S 13/765 |

FOREIGN PATENT DOCUMENTS

| | | |
|---|---|---|
| CN | 102843620 A | 12/2012 |
| CN | 104521160 A | 4/2015 |
| CN | 105680975 A | 6/2016 |
| CN | 106603452 A | 4/2017 |

OTHER PUBLICATIONS

Masami Kihara et al. "System Configuration for Standardizing SDH-Based Time and Frequency Transfer." European Frequency Time Forum. Conference Publication No. 418. Mar. 5-7, 1996. 6 pages.

Huawei Technologies Co., Ltd. "Mapping method to support timing over OTN." International Telecommunication Union, Telecommunication Standardization Sector. May 2010. 8 pages.

Byoung-Yun Lee, et al. "Simple Synchronizer to Enhance Time Accuracy for Legacy Ethernet Applications." ISOCC. 2009. 4 pages.

"Broadcom BCM84836 Dual 10GBASE-Transceiver." Jun. 14, 2011. 2 pages.

* cited by examiner

TIME SYNCHRONIZATION METHOD, APPARATUS, AND SYSTEM

CROSS-REFERENCE TO RELATED APPLICATIONS

This application is a continuation of International Application No. PCT/CN2017/120075, filed on Dec. 29, 2017, the disclosure of which is hereby incorporated by reference in its entirety.

TECHNICAL FIELD

This application relates to the communications field, and in particular, to a time synchronization method, apparatus, and system.

BACKGROUND

A full name of the Institute of Electrical and Electronics Engineers (IEEE) 1588 protocol is "Standard for a Precision Clock Synchronization Protocol for Networked Measurement and Control Systems", which defines a Precision Time Protocol (PTP). A basic function of the Precision Time Protocol is to maintain synchronization between a most precise clock and other clocks in a distributed network. In actual application, IEEE 1588 is a master-slave synchronization system. In a synchronization process of the system, a master node periodically releases a time synchronization packet and timestamp information, a slave node obtains the related time synchronization packet and timestamp information by exchanging a packet with the master node, and calculates a line time delay and a time difference between the master node and the slave node. The slave node then uses the time difference to adjust a local time, so that a slave node time is consistent with a master node time.

With development of communications technologies, an increasingly strict requirement is imposed on an offset of time synchronization between base stations in a communications scenario. For example, in a 5th Generation (5G) mobile communications network, an offset of time synchronization between base stations is required to fall within 100 ns, imposing a strict requirement on time synchronization in an optical switching network. For example, a time synchronization precision loss caused by a single-hop device needs to be controlled to fall within 5 ns. However, in an optical transport network at a metropolitan convergence layer, a photonic integrated device (PID) scenario is usually used. In this scenario, no dedicated optical supervisory channel (OSC) is used to transmit a 1588 time synchronization packet, and the 1588 synchronization packet needs to be transmitted through an electric supervisory channel (ESC). During transmission through the ESC channel, all time synchronization packet data needs to be forwarded by using a line-side optical module. As an optical module becomes more complex, delay uncertainty caused by the optical module is higher. For example, the delay uncertainty is usually above a magnitude of 10 ns, causing a bottleneck to a 5G high-precision time synchronization technology.

SUMMARY

Various embodiments can provide a time synchronization method, apparatus, and system, to improve precision of time synchronization.

According to a first aspect, a time synchronization method is provided, including: receiving, by a slave node, a first signal from a master node, where the first signal includes a first synchronization sequence; sampling, by the slave node, the first signal, to obtain a first sample; quantizing, by the slave node, the first sample, to obtain a quantized form of the first sample; detecting, by the slave node, the first synchronization sequence from the quantized form of the first sample, where a moment of detecting the first synchronization sequence is T2; receiving, by the slave node, first information from the master node, where the first information is used to indicate a moment T1 at which the master node sends the first synchronization sequence; sending, by the slave node, a second synchronization sequence to the master node, where a moment of sending the second synchronization sequence is T3; receiving, by the slave node, second information from the master node, where the second information is used to indicate a moment T4 at which the master node detects a quantized form of the second synchronization sequence; and performing, by the slave node, time synchronization between the slave node and the master node based on T1, T2, T3, and T4.

In this embodiment, time synchronization is performed between the master node and the slave node by sending the first synchronization sequence and the second synchronization sequence, and the moments of receiving the synchronization sequences are determined when the synchronization sequences are in the quantized forms. Therefore, relatively few types of signal processing are performed on the synchronization sequences, so that delay uncertainty caused by different signal processing can be reduced, thereby improving precision of time synchronization.

In an example implementation, the detecting, by the slave node, the first synchronization sequence from the quantized form of the first sample includes: performing, by the slave node, correlation peak detection of the first synchronization sequence on the quantized form of the first sample.

In an example implementation, the first signal further includes a third synchronization sequence used for group synchronization, and a first offset exists between a first element of the third synchronization sequence and a first element of the first synchronization sequence; and the detecting, by the slave node, the first synchronization sequence from the quantized form of the first sample includes: determining, by the slave node, a first location, where the first location is a location of the first element of the third synchronization sequence in the quantized form of the first sample; determining, by the slave node, a second location based on the first location and the first offset, where the second location is a location of the first element of the first synchronization sequence in the quantized form of the first sample; obtaining, by the slave node, a quantized form of a second sample based on the second location, where the first sample includes the second sample; and detecting, by the slave node, the first synchronization sequence from the quantized form of the second sample.

In this embodiment, the first offset exists between the third synchronization sequence used for group synchronization and the first synchronization sequence. Therefore, after determining the first location of the third synchronization sequence in the quantized form of the first sample, the slave node may determine the second location of the first synchronization sequence based on the first offset, and obtain the quantized form of the second sample based on the second location, to perform correlation peak detection of the first synchronization sequence. This reduces an operation amount of correlation peak detection, and improves efficiency of correlation peak detection, thereby improving efficiency of time synchronization between the master node and the slave node.

In an example implementation, the determining, by the slave node, a first location includes: performing, by the slave node, correlation peak detection of the third synchronization sequence on the quantized form of the first sample, to determine the first location; and the detecting, by the slave node, the first synchronization sequence from the quantized form of the second sample includes: performing, by the slave node, correlation peak detection of the first synchronization sequence on the quantized form of the second sample.

In an example implementation, the sending, by the slave node, a second synchronization sequence to the master node includes: generating, by the slave node, an encoded codeword; inserting, by the slave node, the second synchronization sequence into the encoded codeword, where a moment of inserting the second synchronization sequence is T3; processing, by the slave node, the encoded codeword into which the second synchronization sequence is inserted, to generate a second signal; and sending, by the slave node, the second signal to the master node.

In this embodiment, time synchronization is performed between the master node and the slave node by sending the first synchronization sequence and the second synchronization sequence, and T3 used for time synchronization is a moment of inserting the second synchronization sequence after encoding. Therefore, relatively few types of signal processing are performed on the second synchronization sequence before the second synchronization sequence is detected, so that delay uncertainty caused by different signal processing can be reduced, thereby improving precision of time synchronization.

In an example implementation, the slave node inserts, into the encoded codeword, a fourth synchronization sequence used for group synchronization, where a second offset exists between a first element of the fourth synchronization sequence and a first element of the second synchronization sequence.

In this embodiment, the second offset exists between the fourth synchronization sequence used for group synchronization and the second synchronization sequence. Therefore, after determining a third location of the fourth synchronization sequence, the master node may extract, based on the second offset, a quantized form that is of a fourth sample and in which the second synchronization sequence is located, to perform correlation peak detection of the second synchronization sequence. This reduces an operation amount of correlation peak detection, and improves efficiency of correlation peak detection, thereby improving efficiency of time synchronization between the master node and the slave node.

In an example implementation, before the receiving, by a slave node, a first signal from a master node, the method further includes: receiving, by the slave node, first primary synchronization information from the master node, where the first primary synchronization information is used to trigger the slave node to detect whether the signal received by the slave node from the master node includes the first synchronization sequence.

In this embodiment, the master node sends the first primary synchronization information to the slave node, to instruct the slave node to trigger detection of the first synchronization sequence, so that the slave node may perform detection in a time window starting from a moment of receiving the first primary synchronization information, instead of continuously performing detection, thereby improving efficiency of detecting the first synchronization sequence.

In an example implementation, before the sending, by the slave node, a second synchronization sequence to the master node, the method further includes: sending, by the slave node, first secondary synchronization information to the master node, where the first secondary synchronization information is used to trigger the master node to detect whether the signal from the slave node includes the second synchronization sequence.

In this embodiment, the slave node sends the first secondary synchronization information to the master node, to instruct the master node to trigger detection of the second synchronization sequence, so that the master node may perform detection in a time window starting from a moment of receiving the first secondary synchronization information, instead of continuously performing detection, thereby improving efficiency of detecting the second synchronization sequence.

In an example implementation, after the sending, by the slave node, a second synchronization sequence to the master node, the method further includes: sending, by the slave node, second secondary synchronization information to the master node, where the second secondary synchronization information is used to indicate that the slave node has sent the second synchronization sequence.

In this embodiment, the slave node sends the second secondary synchronization information to the master node, to indicate that the second synchronization sequence has been sent. Therefore, after receiving the second secondary synchronization information, the master node may stop detecting the second synchronization sequence. This can avoid a resource waste caused by continuously performing correlation peak detection when the master node fails to detect the second synchronization sequence. Therefore, a protection mechanism exists when detection of the second synchronization sequence fails, thereby improving time synchronization efficiency.

In an example implementation, the receiving, by the slave node, second information from the master node includes: when the master node detects the second synchronization sequence, receiving, by the slave node, the second information from the master node; and further includes: when the master node detects no second synchronization sequence, receiving, by the slave node, second primary synchronization information from the master node, where the second primary synchronization information is used to indicate that the master node fails to detect the second synchronization sequence.

In this embodiment, when the master node fails to detect the second synchronization sequence, the master node sends the second primary synchronization information to the slave node, to indicate that detection of the second synchronization sequence fails. Therefore, a protection mechanism exists when detection of the second synchronization sequence fails, so that the slave node discards invalid data, thereby improving time synchronization efficiency.

According to a second aspect, a time synchronization method is provided, including: sending, by a master node, a first signal to a slave node, where the first signal includes a first synchronization sequence; sending, by the master node, first information to the slave node, where the first information is used to indicate a moment T1 at which the master node sends the first synchronization sequence; receiving, by the master node, a second signal from the slave node, where the second signal includes a second synchronization sequence; sampling, by the master node, the second signal, to obtain a third sample; quantizing, by the master node, the third sample, to obtain a quantized form of the third sample; detecting, by the master node, the second synchronization sequence from the quantized form of the third sample, where a moment of detecting the second synchronization sequence is T4; and sending, by the master node, second information to the slave node, where the second information is used to indicate T4, and T1 and T4 are used for time synchronization between the master node and the slave node.

In this embodiment, time synchronization is performed between the master node and the slave node by sending the first synchronization sequence and the second synchronization sequence, and moments of receiving the synchronization sequences are determined when the synchronization sequences are in the quantized forms. Therefore, relatively few types of signal processing are performed on the synchronization sequences, so that delay uncertainty caused by different signal processing can be reduced, thereby improving precision of time synchronization.

In an example implementation, the detecting, by the master node, the second synchronization sequence from the quantized form of the third sample includes: performing, by the master node, correlation peak detection of the second synchronization sequence on the quantized form of the third sample.

In an example implementation, the second signal further includes a fourth synchronization sequence used for group synchronization, and a second offset exists between a first element of the fourth synchronization sequence and a first element of the second synchronization sequence; and the detecting, by the master node, the second synchronization sequence from the quantized form of the third sample includes: determining, by the master node, a third location, where the third location is a location of the first element of the fourth synchronization sequence in the quantized form of the third sample; determining, by the master node, a fourth location based on the third location and the second offset, where the fourth location is a location of the first element of the second synchronization sequence in the quantized form of the third sample; obtaining, by the master node, a quantized form of a fourth sample based on the fourth location, where the third sample includes the fourth sample; and detecting, by the master node, the second synchronization sequence from the quantized form of the fourth sample.

In this embodiment, the second offset exists between the fourth synchronization sequence used for group synchronization and the second synchronization sequence. Therefore, after determining the third location of the fourth synchronization sequence, the master node may extract, based on the second offset, the quantized form that is of the fourth sample and in which the second synchronization sequence is located, to perform correlation peak detection of the second synchronization sequence. This reduces an operation amount of correlation peak detection, and improves efficiency of correlation peak detection, thereby improving efficiency of time synchronization between the master node and the slave node.

In an example implementation, the determining, by the master node, a third location includes: performing, by the master node, correlation peak detection of the fourth synchronization sequence on the quantized form of the third sample, to determine the third location; and the detecting, by the master node, the second synchronization sequence from the quantized form of the fourth sample includes: performing, by the master node, correlation peak detection of the second synchronization sequence on the quantized form of the fourth sample.

In an example implementation, the sending, by a master node, a first signal to a slave node includes: generating, by the master node, an encoded codeword; inserting, by the master node, the first synchronization sequence into the encoded codeword, where a moment of inserting the first synchronization sequence is T1; processing, by the master node, the encoded codeword into which the first synchronization sequence is inserted, to generate the first signal; and sending, by the master node, the first signal to the slave node.

In an example implementation, the method further includes: inserting, by the master node into the encoded codeword, a third synchronization sequence used for group synchronization, where a first offset exists between a first element of the third synchronization sequence and a first element of the first synchronization sequence.

In this embodiment, the first offset exists between the third synchronization sequence used for group synchronization and the first synchronization sequence. Therefore, after determining the first location of the third synchronization sequence in the quantized form of the first sample, the slave node may determine the second location of the first synchronization sequence based on the first offset, and obtain the quantized form of the second sample based on the second location, to perform correlation peak detection of the first synchronization sequence. This reduces an operation amount of correlation peak detection, and improves efficiency of correlation peak detection, thereby improving efficiency of time synchronization between the master node and the slave node.

In an example implementation, before the sending, by a master node, a first signal to a slave node, the method further includes: sending, by the master node, first primary synchronization information to the slave node, where the first primary synchronization information is used to trigger the slave node to detect whether the signal received by the slave node from the master node includes the first synchronization sequence.

In this embodiment, the master node sends the first primary synchronization information to the slave node, to instruct the slave node to trigger detection of the first synchronization sequence, so that the slave node may perform detection in a time window starting from a moment of receiving the first primary synchronization information, instead of continuously performing detection, thereby improving efficiency of detecting the first synchronization sequence.

In an example implementation, before the receiving, by the master node, a second signal from the slave node, the method further includes: receiving, by the master node, first secondary synchronization information from the slave node, where the first secondary synchronization information is used to trigger the master node to detect whether the signal from the slave node includes the second synchronization sequence.

In this embodiment, the slave node sends the first secondary synchronization information to the master node, to instruct the master node to trigger detection of the second synchronization sequence, so that the master node may perform detection in a time window starting from a moment of receiving the first secondary synchronization information, instead of continuously performing detection, thereby improving efficiency of detecting the second synchronization sequence.

In an example implementation, after the receiving, by the master node, a second signal from the slave node, the method further includes: receiving, by the master node, second secondary synchronization information from the slave node, where the second secondary synchronization information is used to indicate that the slave node has sent the second synchronization sequence.

In this embodiment, the slave node sends the second secondary synchronization information to the master node, to indicate that the second synchronization sequence has been sent. Therefore, after receiving the second secondary synchronization information, the master node may stop detecting the second synchronization sequence. This can avoid a resource waste caused by continuously performing correlation peak detection when the master node fails to detect the second synchronization sequence. Therefore, a protection mechanism exists when detection of the second synchronization sequence fails, improving time synchronization efficiency.

In an example implementation, the sending, by the master node, second information to the slave node includes: when the master node detects the second synchronization sequence, sending, by the master node, the second information to the slave node; and further includes: when the master node detects no second synchronization sequence, sending, by the master node, second primary synchronization information to the slave node, where the second primary synchronization information is used to indicate that the master node fails to detect the second synchronization sequence.

In this embodiment, when the master node fails to detect the second synchronization sequence, the master node sends the second primary synchronization information to the slave node, to indicate that detection of the second synchronization sequence fails. Therefore, a protection mechanism exists when detection of the second synchronization sequence fails, so that the slave node discards invalid data, thereby improving time synchronization efficiency.

According to a third aspect, a node is provided, where the node is configured to perform the method implemented by a slave node in any one of the first aspect or the possible implementations of the first aspect. Specifically, the node includes a module configured to perform the method in any one of the first aspect or the possible implementations of the first aspect.

According to a fourth aspect, a node is provided, where the node is configured to perform the method implemented by a master node in any one of the second aspect or the possible implementations of the second aspect. Specifically, the node includes a module configured to perform the method in any one of the second aspect or the possible implementations of the second aspect.

According to a fifth aspect, a node is provided, where the node includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the processor can perform the method performed by a slave node in any one of the first aspect or the possible implementations of the first aspect.

According to a sixth aspect, a node is provided, where the node includes a communications interface, a memory, a processor, and a bus system. The communications interface, the memory, and the processor are connected by using the bus system. The memory is configured to store an instruction. The processor is configured to execute the instruction stored in the memory, to control the communications interface to receive a signal and/or send a signal. In addition, when the processor executes the instruction stored in the memory, the processor can perform the method performed by a master node in any one of the second aspect or the possible implementations of the second aspect.

According to a seventh aspect, a master-slave synchronization system is provided, where the system includes the nodes in the third aspect and the fourth aspect, or the system includes the nodes in the fifth aspect and the sixth aspect.

According to an eighth aspect, a computer readable medium is provided, and is configured to store a computer program, and the computer program includes an instruction used to perform the method in any one of the first aspect or the possible implementations of the first aspect.

According to a ninth aspect, a computer readable medium is provided, and is configured to store a computer program, and the computer program includes an instruction used to perform the method in any one of the second aspect or the possible implementations of the second aspect.

DESCRIPTION OF EMBODIMENTS

Figure 1:
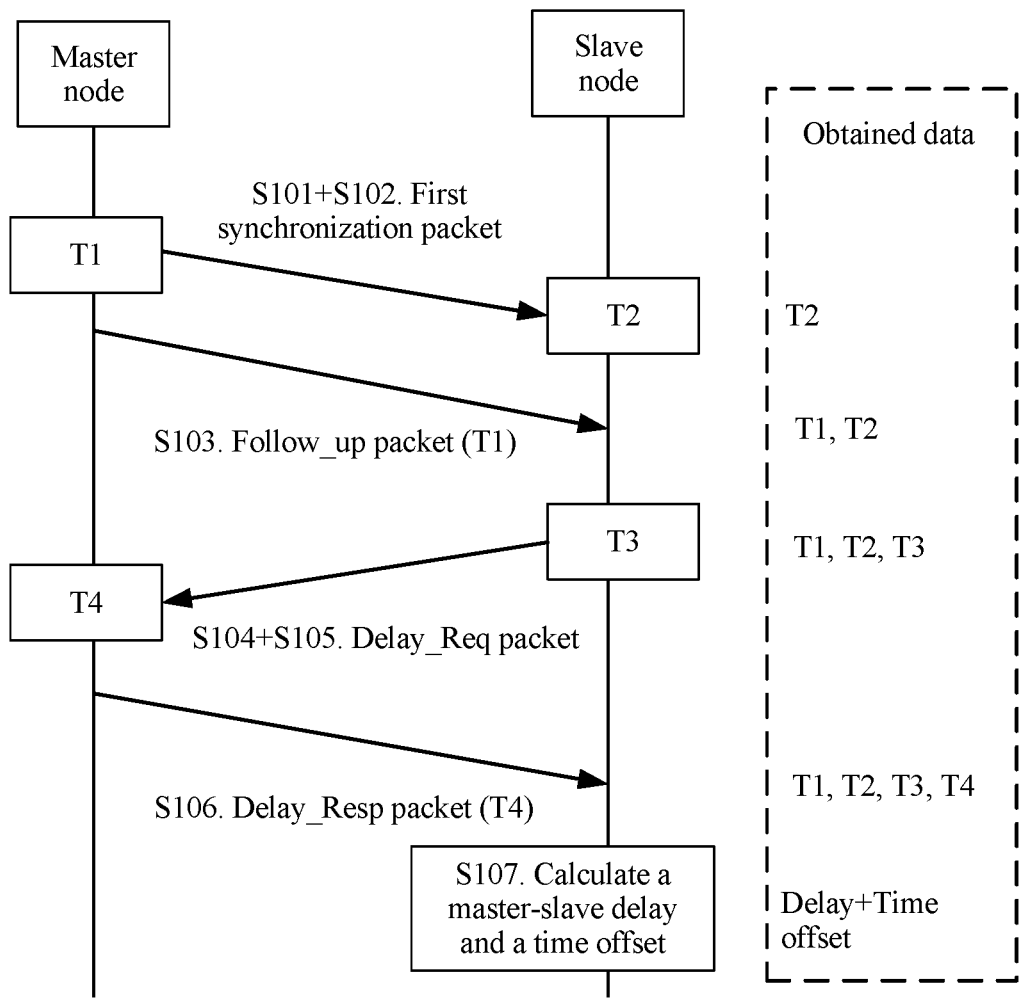
FIG. 1 is a schematic diagram of a process of time synchronization between a master node and a slave node in a related technology.

The technical solutions of the embodiments in accordance with the disclosure may be applied to various communications systems, such as: an optical communications system, a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, a future 5th Generation (5G) system, or a New Radio (NR) system.

A node (for example, a master node or a slave node) in various embodiments in accordance with the disclosure may be a device used for communicating with a terminal device. The node may be a base transceiver station (BTS) in the Global System for Mobile Communications (GSM) or the Code Division Multiple Access (CDMA) system, or may be a NodeB (NB) in the Wideband Code Division Multiple Access (WCDMA) system, or may be an evolved NodeB (eNB or eNodeB) in the LTE system, or may be a radio controller in a cloud radio access network (CRAN) scenario; or the network device may be a relay station, an access point, an in-vehicle device, a wearable device, a network device in a future 5G network, a network device in a future evolved PLMN network, or the like. This is not limited in the embodiments of this application.

The following describes the technical solutions in accordance with the disclosure with reference to accompanying drawings.

For ease of understanding, the following describes concepts of some terms used in this application.

Optical module: A function of the optical module is optical-to-electrical conversion. After processing data, a transmit end converts an electrical signal into an optical signal, and after the optical signal is transmitted by using an optical fiber, a receive end converts the optical signal into an electrical signal, and performs lossless restoration on the data.

Serializer/deserializer (serdes, SDS): is a module used for serial/parallel conversion.

Framer/deframer (FRM): a frame mapping/demapping module in an optical module. The framer/deframer can map a constant bit rate (constant bit rate, CBR) service to an optical channel transport unit (OTU) service.

Transmission digital signal processor (Tx DSP): a digital signal processing module in a sending direction, configured to preprocess a to-be-sent signal, for example, perform channel equalization, or perform noise reduction processing on the to-be-sent signal.

Reception digital signal processor (Rx DSP): a digital signal processing module in a receiving direction, which may perform determining on a received signal. Determining means determining a quantized digital signal as a binary digital signal. The received digital signal processor may further perform group synchronization on received signals. During digital communication, generally, a specific quantity of elements form a "word" or "sentence", to be specific, form a "group" to be transmitted. Group synchronization is to identify a start/end moment of a digital information group ("word" or "sentence"), or to provide a "start" moment and an "end" moment of each group. Group synchronization is sometimes referred to as frame synchronization. To implement group synchronization, some special code words may be inserted into a digital information stream as a head/tail mark of each group. These special code words may be a synchronization sequence used for group synchronization. An element is a basic signal unit that carries an information amount. For example, an element may be symbols that are used to represent a binary number and that have a same time interval.

Electrical-to-optical conversion (E/O) module: is configured to convert an electrical signal into an optical signal.

Optical-to-electrical conversion (O/E) module: configured to convert an optical signal into an electrical signal.

Digital-to-analog conversion circuit (DAC): a digital signal processing module in a sending direction, configured to convert a digital signal into an analog signal.

Analog-to-digital conversion circuit (ADC): a digital signal processing module in a receiving direction, configured to convert an analog signal into a digital signal. The DAC may be configured to sample an input analog signal, to obtain a sample. The sample is then quantized to obtain a quantized form of the sample. The sample obtained through sampling may be a digital signal that is discrete in time domain, and the quantized form of the sample (or a quantized sample) may be a digital signal that is discrete in both time domain and amplitude.

First in first out (FIFO): used to buffer data.

Forward error correction (FEC): a data encoding technology, in which a receive end may be configured to verify a detection error in transmission. In an FEC manner, a receive end not only can discover an error of data, but also can determine a location of an error occurring in a binary element, to correct the error.

Channel equalization: an anti-fading measure used to improve transmission performance of a communications system in a fading channel.

Correlation peak: an autocorrelation operation performed on a segment of signal sequence. When signals overlap, autocorrelation energy is highest, and an energy peak that is apparently different from those of other locations can be seen.

Synchronization sequence used for group synchronization: a specific element sequence, used for synchronization and channel estimation at a receive end.

FIG. 1 is a schematic diagram of a process of time synchronization between a master node and a slave node in a related technology. The following first describes a synchronization process of the 1588 protocol in a related technology with reference to FIG. 1.

S101. A master node (Master) sends a first synchronization (sync) packet to a slave node (slave), and records a sending moment T1 into a register.

S102. The slave node receives the first synchronization packet, and records a moment T2 of receiving the first synchronization packet.

S103. The master node sends a Follow_up packet to the slave node, where the "Follow_up" packet includes the moment T1.

S104. The slave node sends a Delay_ReqDelay packet to the master node, and records a moment T3 of sending the Delay_Req packet.

S105. The master node receives the Delay_Req packet, and records a moment T4 of receiving the Delay_Req packet.

S106. The master node sends a Delay_RespDelay packet to the slave node, where the Delay_Resp packet includes T4.

S107. The slave node may calculate a delayDelay and a time offset between the master node and the slave node based on T1 to T4. A calculation formula is as follows:

$$\text{Delay} = \frac{(T2 - T1) + (T4 - T3)}{2} \quad (1)$$

$$\text{Offset} = \frac{(T2 - T1) - (T4 - T3)}{2} \quad (2)$$

Delay is used to represent a delay, and the delay represents a delay time caused in network transmission. Offset is used to indicate an offset, and the offset represents a time difference between a slave clock and a master clock.

The slave node may adjust a clock of the slave node based on a calculated delay and offset, to synchronize the clock with that of the master node.

Figure 2:
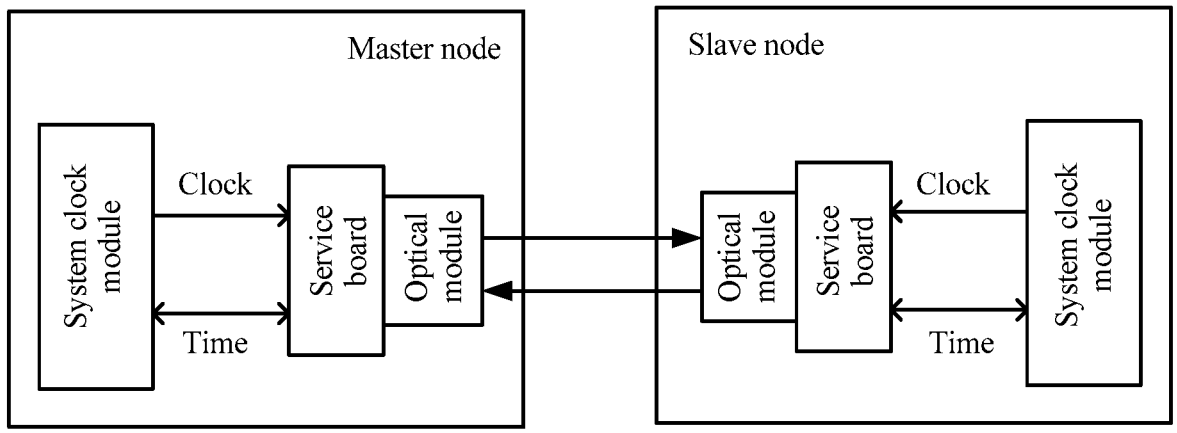
FIG. 2 is a schematic diagram of an application environment according to an embodiment of this application.

The following describes an application environment of this embodiment with reference to FIG. 2. FIG. 2 shows a module through which a signal used for time synchronization between the master node and the slave node passes. As shown in FIG. 2, on a master node side, a signal is transmitted to an optical fiber after passing through a system clock module, a service board, and an optical module, and is then sent to the slave node. After the slave node receives the signal by using the optical fiber, the signal passes through an optical module and a service board, and then arrives at a system clock module.

The service board may also be referred to as a line card, and may be configured to generate a time synchronization pulse signal, and perform timestamping and protocol processing.

The system clock module may be a clock of a network element device, and is configured to provide synchronization timing and time information for all service boards on the network element device. The system clock module may be configured to implement timestamp calculation, filtering, and adjustment. For example, the network element device may be the node in this embodiment.

A line-side optical module is equivalent to a service line, and introduces a delay during time synchronization. In a related technology, an optical module can support only a delay report function. The optical module may read a location of an FIFO waterline inside the optical module to calculate uplink and downlink delays. However, precision is relatively low in this manner. For example, in the related technology, precision of only about 20 ns can be implemented.

Figure 3:
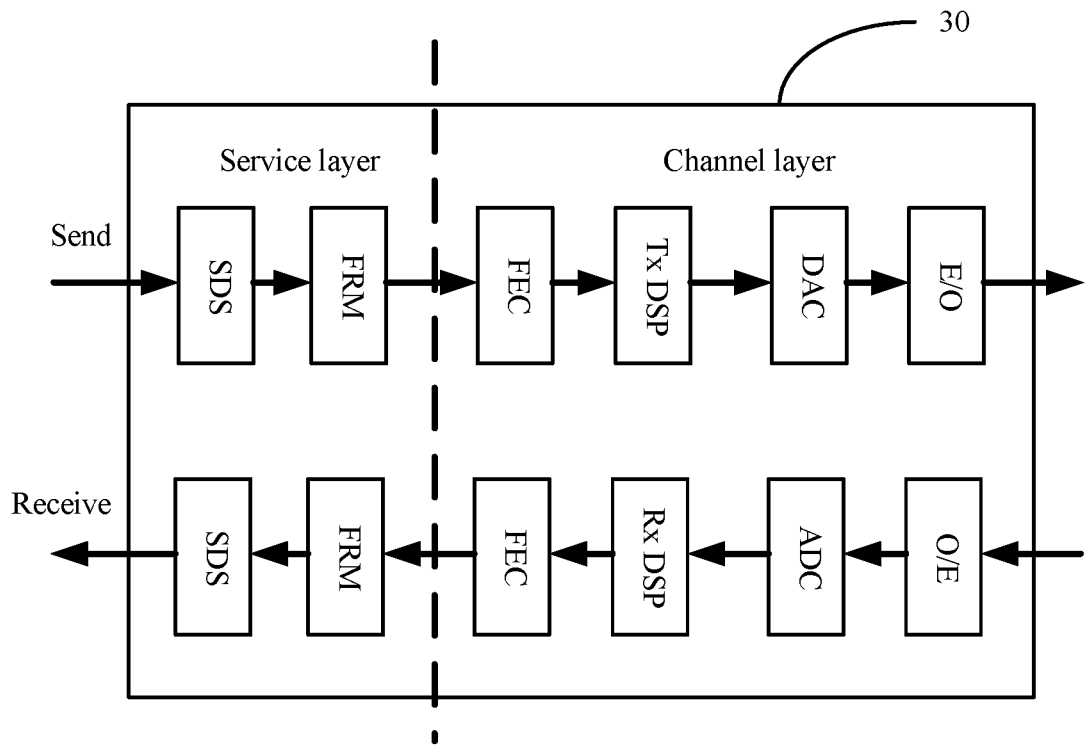
FIG. 3 is a schematic diagram of an internal structure of an optical module in a related technology.

FIG. 3 is a schematic diagram of an internal structure of an optical module 30 in the related technology. FIG. 3 shows paths through which an optical channel transport unit (OTU) service passes in a sending direction and a receiving direction. A side of an SDS module is connected to a service board, and a side of an electrical-to-optical conversion (E/O) module or an optical-to-electrical conversion (O/E) module is connected to an optical fiber.

In an optical transport network, an OTU represents a framed optical channel data information structure. The OTU may include a data payload area and an overhead area. Alternatively, an OTUx may be used to represent a framed optical channel data information structure, x represents an order of an OTU service, and a higher order indicates a higher rate. Packets and data sent in the optical transport network may be carried over the OUT for transmission.

In the sending direction, the OTU service passes through the SDS module, an FRM module, an FEC module, a Tx DSP module, a digital-to-analog conversion circuit (DAC), and an E/O module. The SDS module and the FRM belong to a service layer. The FEC module, the Tx DSP module, the DAC, and the E/O module belong to a channel layer. Specifically, a service on a DAC line card is sent to the optical module by passing through the SDS. Inside the optical module, the FRM implements OTUx service framing detection, and then channel FEC encoding is performed, and channel equalization algorithm processing is performed in the Tx DSP. The service passes through the DAC, and is converted by the E/O module into an optical signal, and is sent to the optical fiber.

In the receiving direction, the OTU service successively passes an O/E module, an ADC, an Rx DSP module, an FEC module, an FRM module and an SDS module. The SDS module and the FRM belong to the service layer. The FEC module, the Rx DSP module, the ADC, and the O/E module belong to the channel layer. Specifically, the O/E module and the ADC collect and obtain line sample data, and after the Rx DSP performs channel equalization algorithm processing, FEC error correction is performed, to implement lossless reception of the service, and then the data is sent to the service board by using the SDS after FRM framing.

According to the foregoing descriptions, in the related technology, the uplink and downlink delays are calculated by reading the location of the FIFO waterline inside the optical module. During signal processing, the FIFO is located in a position at an upper layer of the FEC, that is, located in a position at the service layer. For example, at a receive end, after a time synchronization packet is received from the optical fiber, the signal needs to be processed by a plurality of modules before a delay can be reported. A time synchronization method in the 1588 protocol is based on an ideal condition: Signals in a sending direction and a receiving direction are processed at a same moment inside a node. However, in actual application, processing moments of a plurality of signal processing modules through which the signal passes in the sending direction and the receiving direction have an error, and delay uncertainty is caused, affecting precision of time synchronization between a master node and a slave node. In addition, more processing modules through which the signal passes lead to larger delay uncertainty and lower precision of time synchronization.

An embodiment in accordance with the disclosure provides a time synchronization method. A main idea of the time synchronization method is to add a synchronization sequence used for time synchronization to a signal sent by a master/slave node, and to detect the synchronization sequence when a received signal is in a quantized form, to determine a moment for time synchronization. In this way, time synchronization can be implemented at a lower layer during signal processing, thereby reducing delay uncertainty and improving precision of time synchronization.

In one embodiment, a synchronization sequence used for time synchronization may be added to a signal of a transmit end, and a receive end may perform synchronization and timestamping through correlation peak detection of the synchronization sequence. In addition, the service layer implements a process of time synchronization between the master node and the slave node based on a time stamp and an algorithm. The foregoing transmit end may be a master node, the foregoing receive end may be a slave node, and the foregoing synchronization sequence may replace the first synchronization packet in S101 in FIG. 1. Alternatively, the foregoing transmit end may be a slave node, the foregoing receive end may also be a slave node, and the foregoing synchronization sequence may replace the Delay_Req packet in S105 in FIG. 1.

The transmit end may add the synchronization sequence used for time synchronization to an encoded codeword that is obtained through encoding (for example, after FEC is performed). Then processing may be performed based on the encoded codeword to which the synchronization sequence is added, to generate a signal, and send the signal to the receive end. The foregoing processing may include, for example, preprocessing, analog-to-digital conversion, and E/O conversion on the encoded codeword. The receive end may detect a quantized form of the synchronization sequence, to determine a moment of receiving the synchronization sequence. The synchronization sequence is inserted after being encoded on a transmit end side, and timestamping is performed before encoding on a receive end side. Therefore, time synchronization can be implemented at a lower layer during signal processing. Because fewer types of processing are performed on the signal before the quantized form of the synchronization sequence is detected, delay uncertainty is reduced, thereby improving precision of time synchronization.

In addition, the foregoing synchronization sequence may also be referred to as a training sequence. A synchronization sequence is an element sequence, and may be used for time synchronization or channel estimation at the receive end. A synchronization sequence has high correlation operation orthogonality. To be specific, the synchronization sequence has extremely strong autocorrelation energy, but very low energy of co-correlation with any other signal. In addition, the synchronization sequence can still maintain the foregoing features relatively well after channel link noise is superposed. With this characteristic, a synchronization sequence insertion point can be searched for at the receive end by using a correlation operation, that is, time synchronization can be implemented. Synchronization sequence detection by using the foregoing correlation operation may also be referred to as correlation peak detection. The foregoing correlation operation is a time-domain signal convolution. A convolution formula is shown as follows:

$$c(n) = \sum_{k=0}^{n} a(k)b(n-k), n = 0 \sim (n1 + n2) \quad (3)$$

c(n) represents a convolved sequence, a(k) represents a convolution sequence a, b(n-k) represents a deconvolution of a convolution sequence b, n represents a subscript serial number of a convolution sequence result, k represents a subscript serial number of a convolution sequence operation, n1 represents a length of the convolution sequence a, and n2 represents a length of the convolution sequence b.

Figure 4:
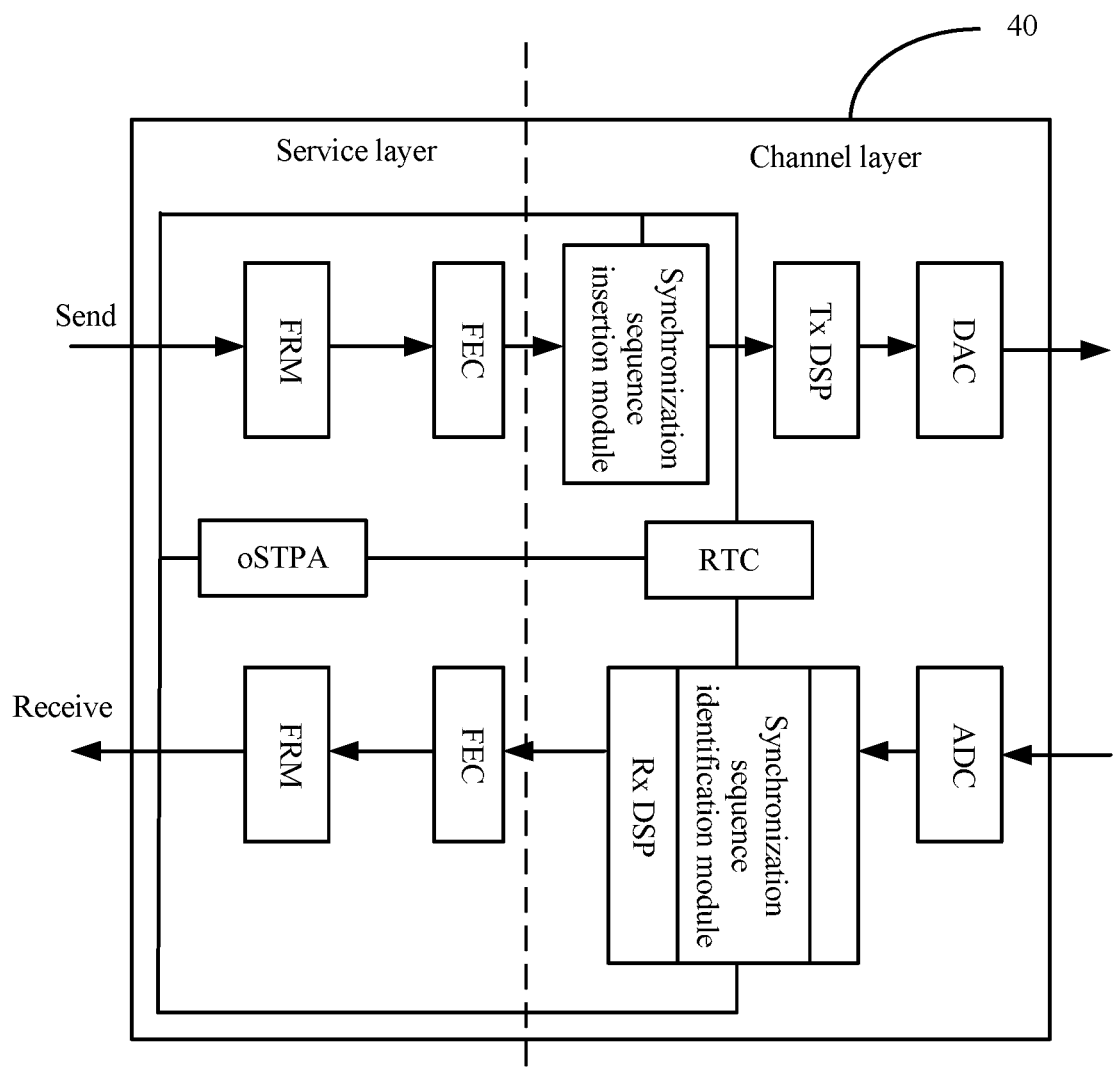
FIG. 4 is a schematic diagram of an internal structure of an optical module according to an embodiment of this application.

FIG. 4 is a structural diagram of an optical module 40 according to this embodiment. As shown in FIG. 4, to implement the time synchronization method in this embodiment, the optical module 40 further includes the following modules:

(1) Optical module time synchronization protocol and algorithm (oTSPA) module: also referred to as an auto-negotiation protocol algorithm module. The oTSPA module is a state machine that is responsible for processing a synchronization sequence received or sent by an optical module, and is configured to implement transmission of a time synchronization signal, and ensure normal transmission of the time synchronization signal by using a specific handshake protocol. The oTSPA module may receive and process a timestamp packet sent by a real time counter (RTC), and insert the timestamp packet into OTU overheads; or place a timestamp packet generated in a synchronization sequence at the channel layer in service layer overheads for transmission. Further, the oTSPA may drive a transmit end synchronization sequence insertion module to insert the synchronization sequence used for time synchronization. The oTSPA may also drive a receive end synchronization sequence identification module to detect the synchronization sequence used for time synchronization.

(2) Transmit end synchronization sequence insertion module: inserts, driven by the auto-negotiation protocol algorithm, the synchronization sequence used for time synchronization, and generates a pulse signal corresponding to the synchronization sequence and sends the pulse signal to the RTC for timestamping. As shown in FIG. 4, after an encoded codeword passes through the transmit end synchronization sequence insertion module, the synchronization sequence used for time synchronization may be inserted into the encoded codeword. In some embodiments, the synchronization sequence used for time synchronization may be inserted into the encoded codeword together with a synchronization sequence used for group synchronization.

Figure 5:
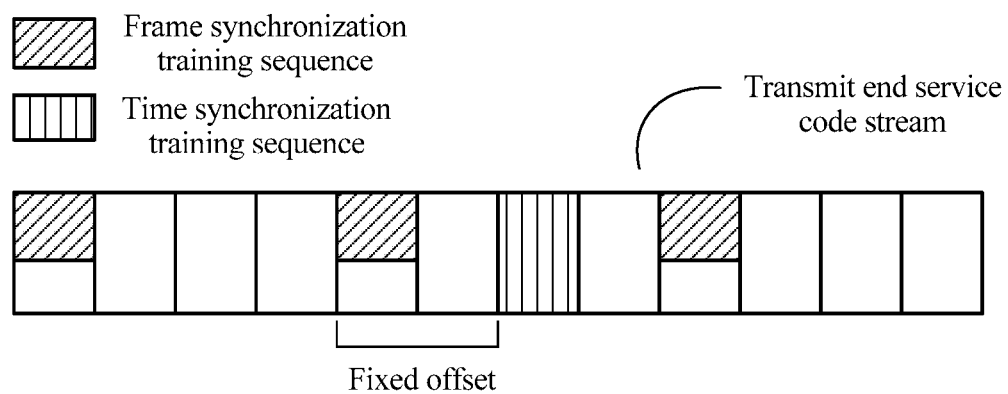
FIG. 5 is a schematic diagram of a frame of inserting a synchronization sequence according to an embodiment of this application.

In some embodiments, when a time synchronization request is initiated, the synchronization sequence used for time synchronization may be inserted into a fixed location following the synchronization sequence used for group synchronization. In addition, a corresponding pulse signal is generated when the synchronization sequence used for time synchronization is inserted, and the pulse signal is sent to the RTC for timestamping. For example, FIG. 5 is a schematic diagram of inserting, into an encoded codeword of the transmit end, a synchronization sequence used for time synchronization. As shown in FIG. 5, when a time synchronization request needs to be initiated, the synchronization sequence used for time synchronization may be inserted into a fixed location following a synchronization sequence used for group synchronization. Therefore, a location of the synchronization sequence used for time synchronization may be obtained by using an offset location of the synchronization sequence used for group synchronization. A correlation operation of correlation peak detection is performed on only one data block extracted from the synchronization sequence used for time synchronization, so that operation complexity can be reduced. In some embodiments, when the time synchronization request is initiated, the synchronization sequence may be inserted into the fixed location, or when no time synchronization request is initiated, an overhead section corresponding to the fixed location may be used to send a random code.

In some embodiments, the transmit end may spare one time synchronization sequence overhead location at an interval of a fixed time unit, to ensure transmission bandwidth utilization.

In some embodiments, in some embodiments, there may be no location association relationship between a synchronization sequence used for time synchronization and a synchronization sequence used for group synchronization.

(3) Receive end synchronization sequence identification module: configured to identify a synchronization sequence in data through a correlation operation, generate a corresponding pulse signal, and send the pulse signal to the RTC for timestamping.

Figure 6:
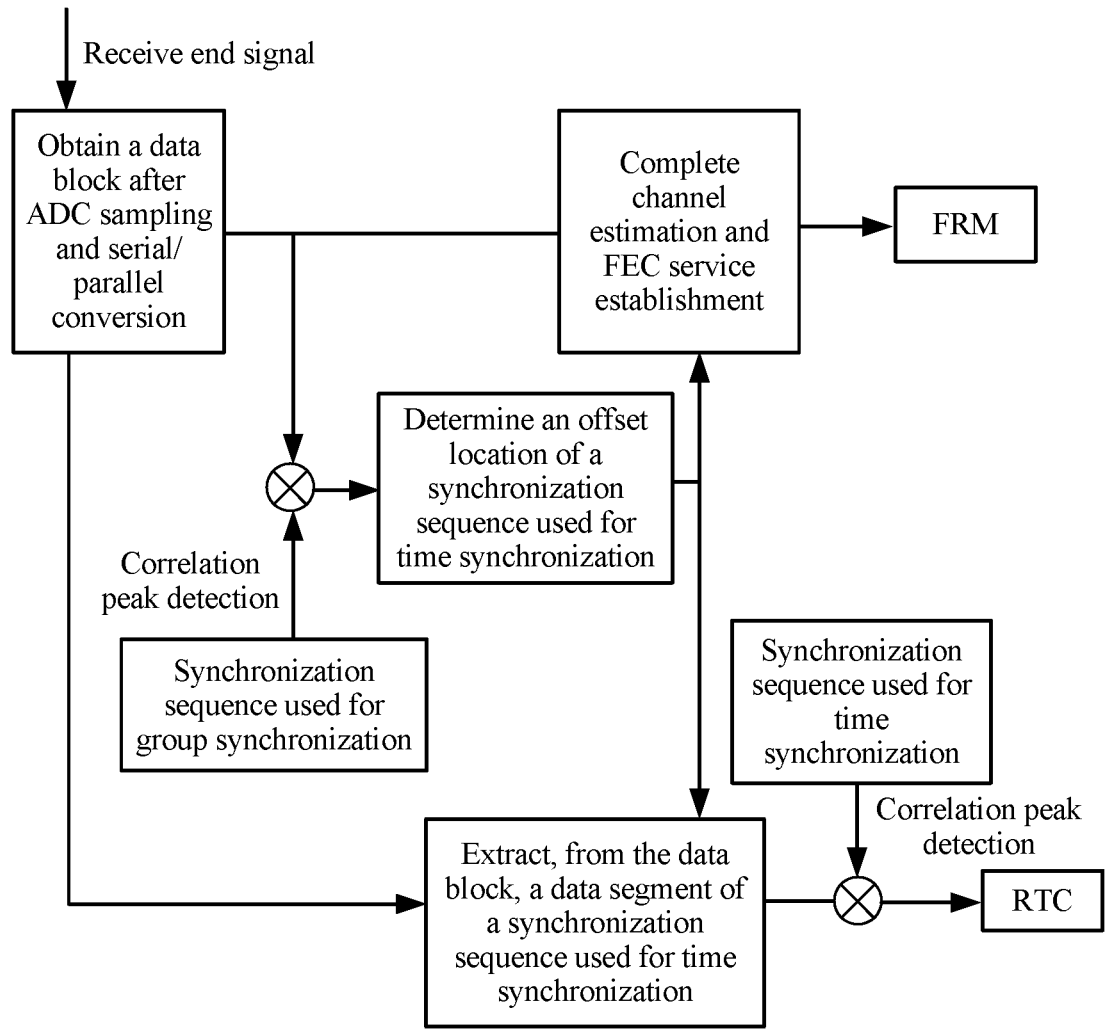
FIG. 6 is a schematic diagram of detecting a synchronization sequence according to an embodiment of this application.

For example, FIG. 6 is a schematic diagram of a process in which the receive end performs correlation peak detection of a synchronization sequence. The receive end may perform correlation peak detection on a data block obtained after ADC sampling and serial/parallel conversion, and when a synchronization sequence used for time synchronization is detected, generate a corresponding pulse signal, and send the pulse signal to the RTC for timestamping. In some embodiments, the receive end may first perform correlation peak detection of a synchronization sequence used for group synchronization, to determine a location of the synchronization sequence used for group synchronization, and determine a location of the synchronization sequence used for time synchronization based on the location of the synchronization sequence used for group synchronization. The receive end may extract, based on the location of the synchronization sequence used for time synchronization, a data segment in the location, and then perform correlation peak detection on the extracted data segment, and at a moment of detecting the synchronization sequence used for time synchronization, generate a corresponding pulse signal, and send the pulse signal to the RTC for timestamping.

(4) Real time counter (RTC): configured to generate a timestamp based on a received pulse signal, and send the timestamp to the oTSPA module.

Figure 7:
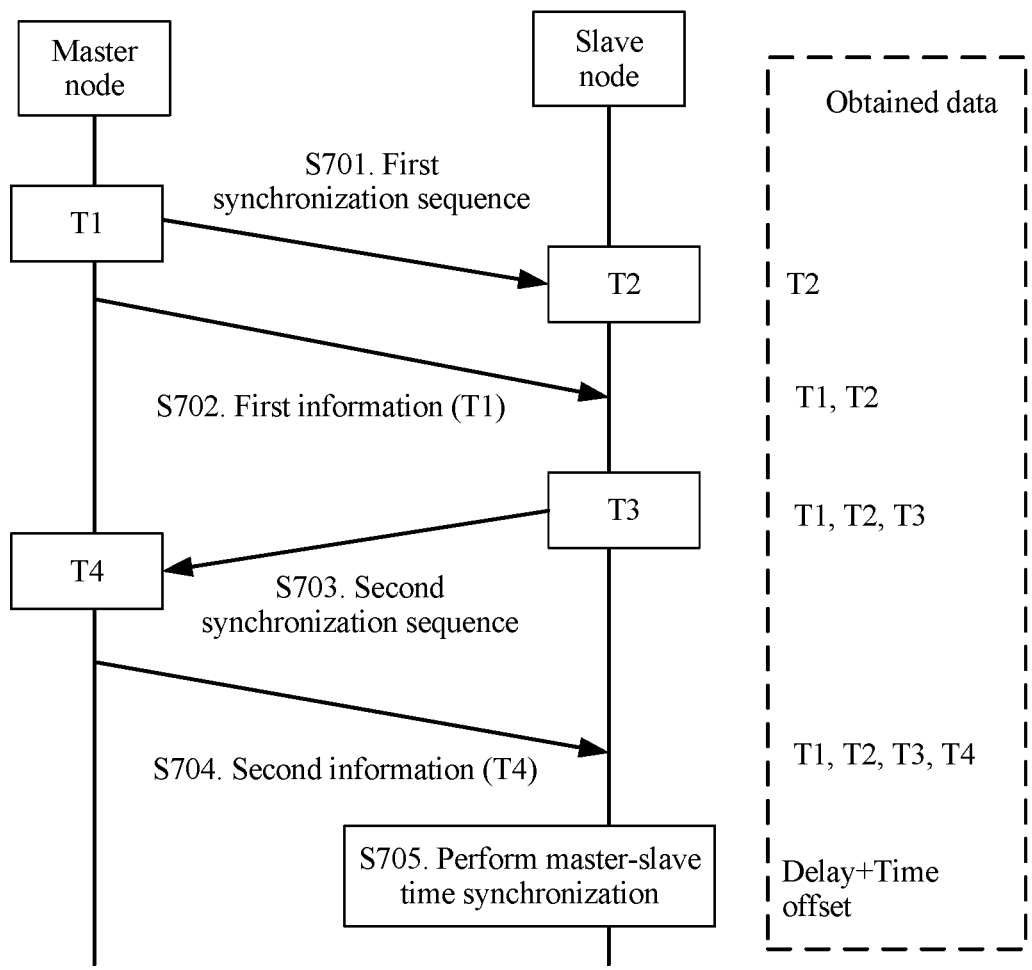
FIG. 7 is a schematic flowchart of a time synchronization method according to an embodiment of this application.

The following describes a time synchronization method 700 according to an embodiment in accordance with reference to FIG. 7. The method 700 may be performed by a master node and a slave node. As shown in FIG. 7, the method 700 includes the following steps.

S701. The master node sends a first signal to the slave node, where the first signal includes a first synchronization sequence, and correspondingly, the slave node receives the first signal from the master node, where a moment at which the master node inserts the first synchronization sequence into an encoded codeword corresponding to the first signal is T1, and a moment at which the slave node detects the first synchronization sequence is T2.

For example, the slave node samples the first signal to obtain a first sample, quantizes the first sample to obtain a quantized form of the first sample, and detects the first synchronization sequence from the quantized form of the first sample. The moment of detecting the first synchronization sequence is T2.

A function of the foregoing first synchronization sequence may be similar to that of the first synchronization packet in FIG. 1. The master node needs to record the moment T1 of sending the first synchronization sequence, and sends T1 to the slave node in subsequent interaction. The slave node needs to record the moment T2 of receiving the first synchronization sequence. T1 and T2 are used for time synchronization between the master node and the slave node.

In some embodiments, the slave node detects the first synchronization sequence from the quantized form of the first sample in two manners. In a first manner, the slave node directly performs correlation peak detection of the first synchronization sequence on the quantized form of the first sample. In a second manner, the first signal further includes a third synchronization sequence used for group synchronization, and a first offset exists between a first element of the third synchronization sequence and a first element of the first synchronization sequence; and the detecting, by the slave node, the first synchronization sequence from the quantized form of the first sample includes: determining, by the slave node, a first location, where the first location is a location of the first element of the third synchronization sequence in the quantized form of the first sample; determining, by the slave node, a second location based on the first location and the first offset, where the second location is a location of the first element of the first synchronization sequence in the quantized form of the first sample; obtaining, by the slave node, a quantized form of a second sample based on the second location, where the first sample includes the second sample; and detecting, by the slave node, the first synchronization sequence from the quantized form of the second sample.

The determining, by the slave node, a first location includes: performing, by the slave node, correlation peak detection of the third synchronization sequence on the quantized form of the first sample, to determine the first location; and the detecting, by the slave node, the first synchronization sequence from the quantized form of the second sample includes: performing, by the slave node, correlation peak detection of the first synchronization sequence on the quantized form of the second sample.

In this embodiment, the first offset exists between the third synchronization sequence used for group synchronization and the first synchronization sequence. Therefore, after determining the first location of the third synchronization sequence in the quantized form of the first sample, the slave node may determine the second location of the first synchronization sequence based on the first offset, and obtain the quantized form of the second sample based on the second location, to perform correlation peak detection of the first synchronization sequence. This reduces an operation amount of correlation peak detection, and improves efficiency of correlation peak detection, thereby improving efficiency of time synchronization between the master node and the slave node.

The slave node may generate a pulse signal corresponding to T2 and perform timestamping at the moment of detecting the first synchronization sequence. For a specific process of generating the pulse signal corresponding to T2 and performing timestamping, refer to content of the receive end synchronization sequence identification module in FIG. 4.

Both the quantized form of the first sample and the quantized form of the second sample are digital signals before a binary digital signal is generated. In other words, the foregoing quantized form is a signal discrete in both time and amplitude. For example, the quantized form of the first sample may be a data block obtained before FEC processing is performed.

S702. The master node sends first information to the slave node, where the first information is used to indicate a moment T1 at which the master node sends the first synchronization sequence, and correspondingly, the slave node receives the first information from the master node.

In some embodiments, a function of the first information is similar to that of the Follow_up packet in FIG. 1. The first information may also be carried in a packet.

In some embodiments, the master node may record T1. For example, that the master node sends the first synchronization sequence to the slave node at the moment T1 includes: generating, by the master node, an encoded codeword; inserting, by the master node, the first synchronization sequence into the encoded codeword, where a moment of inserting the first synchronization sequence is T1; processing, by the master node, the encoded codeword into which the first synchronization sequence is inserted, to generate the first signal; and sending, by the master node, the first signal to the slave node. For example, the master node may generate a pulse signal and perform timestamping when inserting the first synchronization sequence, and a moment corresponding to the timestamp is T1. For a specific process of generating the pulse signal corresponding to T1 and performing timestamping, refer to content related to the transmit end synchronization sequence insertion module in FIG. 4.

For example, the master node may insert the foregoing first synchronization sequence into an encoded codeword on which FEC processing is performed, and generate a timestamp corresponding to T1.

S703. The slave node sends a second synchronization sequence to the master node, where a moment of sending the second synchronization sequence is T3, and correspondingly, the master node receives the second synchronization sequence from the slave node, where a moment at which the master node detects a quantized form of the second synchronization sequence is T4.

A function of the foregoing second synchronization sequence may be similar to that of the Delay_Req packet in FIG. 1. The slave node may record T3, and the master node may record T4, and send T4 to the slave node in subsequent interaction. T3 and T4 are also used for time synchronization between the master node and the slave node.

In some embodiments, the slave node may record T3. In some embodiments, that the slave node sends a second synchronization sequence to the master node includes: generating, by the slave node, an encoded codeword; inserting, by the slave node, the second synchronization sequence into the encoded codeword, where a moment of inserting the second synchronization sequence is T3; processing, by the slave node, the encoded codeword into which the second synchronization sequence is inserted, to generate a second signal; and sending, by the slave node, the second signal to the master node. For example, the slave node may generate a pulse signal and perform timestamping when inserting the second synchronization sequence, and a moment corresponding to the timestamp is T3. For a specific process of generating the pulse signal corresponding to T3 and performing timestamping, refer to content related to the transmit end synchronization sequence insertion module in FIG. 4.

For example, the slave node may insert the foregoing first synchronization sequence into an encoded codeword on which FEC processing is performed, and generate a timestamp corresponding to T3.

That the master node detects the second synchronization sequence from a quantized form of the third sample, where the moment of detecting the second synchronization sequence is T4 specifically includes: receiving, by the master node, the second signal from the slave node, where the second signal includes the second synchronization sequence; sampling, by the master node, the second signal, to obtain the third sample; quantizing, by the master node, the third sample, to obtain the quantized form of the third sample; and detecting, by the master node, the second synchronization sequence from the quantized form of the third sample, where the moment of detecting the second synchronization sequence is T4.

In some embodiments, the master node may detect the second synchronization sequence from the quantized form of the third sample in two manners. In a first manner, the master node directly performs correlation peak detection of the second synchronization sequence on the quantized form of the third sample. In a second manner, the second signal further includes a fourth synchronization sequence used for group synchronization, and a second offset exists between a first element of the fourth synchronization sequence and a first element of the second synchronization sequence; and the detecting, by the master node, the second synchronization sequence from the quantized form of the third sample includes: determining, by the master node, a third location, where the third location is a location of the first element of the fourth synchronization sequence in the quantized form of the third sample; determining, by the master node, a fourth location based on the third location and the second offset, where the second location is a location of the first element of the fourth synchronization sequence in the quantized form of the third sample; obtaining, by the master node, a quantized form of a fourth sample based on the fourth location, where the third sample includes the fourth sample; and detecting, by the master node, the second synchronization sequence from the quantized form of the fourth sample.

The determining, by the master node, a third location includes: performing, by the master node, correlation peak detection of the fourth synchronization sequence on the quantized form of the third sample, to determine the third location. The detecting, by the master node, the second synchronization sequence from the quantized form of the fourth sample includes: performing, by the master node, correlation peak detection of the second synchronization sequence on the quantized form of the fourth sample.

In this embodiment, the second offset exists between the fourth synchronization sequence used for group synchronization and the second synchronization sequence. Therefore, after determining the third location of the fourth synchronization sequence, the master node may extract, based on the second offset, the quantized form that is of the fourth sample and in which the second synchronization sequence is located, to perform correlation peak detection of the second synchronization sequence. This reduces an operation amount of correlation peak detection, and improves efficiency of correlation peak detection, thereby improving efficiency of time synchronization between the master node and the slave node.

The master node may generate a pulse signal corresponding to T4 and perform timestamping at the moment of detecting the second synchronization sequence. For a specific process of generating the pulse signal corresponding to T4 and performing timestamping, refer to content of the receive end synchronization sequence identification module in FIG. 4.

S704. The master node sends second information to the slave node, where the second information is used to indicate T4, and correspondingly, the slave node receives the second information from the master node.

In some embodiments, a function of the second information is similar to that of the Delay_Resp packet in FIG. 1. The second information may also be carried in a packet.

S705. The slave node performs time synchronization between the slave node and the master node based on T1, T2, T3, and T4.

For example, the performing time synchronization between the slave node and the master node based on T1, T2, T3, and T4 may be: substituting, by the slave node, T1, T2, T3, and T4 into the formula (1) and the formula (2) in FIG. 1, to calculate a delay and a time offset between the master node and the slave node. The slave node may adjust a time of the slave node based on the delay and the time offset.

In this embodiment, time synchronization is performed between the master node and the slave node by sending the first synchronization sequence and the second synchronization sequence. The moments T2 and T4 of receiving the synchronization sequences are determined when the synchronization sequences are in the quantized forms, and the moments T1 and T3 of sending the synchronization sequences are subsequent to encoding. In other words, the moments T1 and T3 of sending the synchronization sequences are subsequent to encoding, and the moments T2 and T4 of receiving the synchronization sequences are prior to decoding. Therefore, in the foregoing time intervals, or in other words, in an interval from T1 to T2 and an interval from T3 to T4, relatively few types of signal processing are performed on the synchronization sequences, so that delay uncertainty caused by different signal processing can be reduced, thereby improving precision of time synchronization.

In one solution of this embodiment, a synchronization sequence is used to perform time synchronization. In this manner, the synchronization sequence is detected at a channel layer, and it is possible that a receive end cannot correctly detect the synchronization sequence. Therefore, the following continues to describe the method 700, which further includes a processing method upon a failure in detecting a synchronization sequence.

In some embodiments, before the master node sends the first synchronization sequence to the slave node, the method 700 further includes: sending, by the master node, first primary synchronization information to the slave node, where the first primary synchronization information is used to trigger the slave node to detect whether the signal received by the slave node from the master node includes the first synchronization sequence. Correspondingly, the slave node receives the first primary synchronization information from the master node.

For example, after receiving the first primary synchronization information, the slave node starts correlation peak detection of the first synchronization sequence. If the slave node still detects no first synchronization sequence after receiving the first information, it indicates that the slave node fails to detect the first synchronization sequence. The slave node stops detecting the first synchronization sequence. In this case, the slave node considers T2 indicated by the first information as invalid data, and a new round of a time synchronization process is performed between the master node and the slave node. In other words, the slave node performs correlation peak detection of the first synchronization sequence in a time window between a moment of receiving the first primary synchronization information and a moment of receiving the first information. If detection of the first synchronization sequence in the time window fails, it indicates that time synchronization fails, and a new round of the time synchronization process needs to be started. Therefore, a protection mechanism exits when detection of the first synchronization sequence fails, so that the slave node discards invalid data, thereby improving time synchronization efficiency.

In this embodiment, the master node sends the first primary synchronization information to the slave node, to instruct the slave node to trigger detection of the first synchronization sequence, so that the slave node may perform detection in the time window starting from the moment of receiving the first primary synchronization information, instead of continuously performing detection, thereby improving efficiency of detecting the first synchronization sequence.

In some embodiments, before the slave node sends the second synchronization sequence to the master node, the method 700 further includes: sending, by the slave node, first secondary synchronization information to the master node, where the first secondary synchronization information is used to trigger the master node to detect whether the signal from the slave node includes the second synchronization sequence.

Similar to the first primary synchronization information, the slave node sends the first secondary synchronization information to the master node before sending the second synchronization sequence, to trigger the master node to detect the second synchronization sequence, so that the master node does not need to continuously perform detection.

In some embodiments, after the slave node sends the second synchronization sequence to the master node, the method 700 further includes: sending, by the slave node, second secondary synchronization information to the master node, where the second secondary synchronization information is used to indicate that the slave node has sent the second synchronization sequence.

In this embodiment, after receiving the first secondary synchronization information, the master node starts correlation peak detection of the second synchronization sequence. If the master node still detects no second synchronization sequence after receiving the second secondary synchronization information, it indicates that the master node fails to detect the second synchronization sequence. The master node stops detecting the second synchronization sequence. In this case, the master node sends second primary synchronization information to the slave node, and the information is used to indicate that the master node fails to detect the second synchronization sequence, so that the slave node considers previously recorded T3 as invalid data. In other words, the master node performs correlation peak detection of the second synchronization sequence in a time window between a moment of receiving the first secondary synchronization information and a moment of receiving the second secondary synchronization information. If detection of the second synchronization sequence in the time window fails, it indicates that time synchronization fails, and a new round of the time synchronization process needs to be started. Therefore, a protection mechanism exits when detection of the second synchronization sequence fails, so that the slave node discards invalid data, thereby improving time synchronization efficiency.

In this embodiment, the slave node sends the second secondary synchronization information to the master node, to indicate that the second synchronization sequence has been sent. Therefore, after receiving the second secondary synchronization information, the master node may stop detecting the second synchronization sequence. This can avoid a resource waste caused by continuously performing correlation peak detection when the master node fails to detect the second synchronization sequence. Therefore, a protection mechanism exists when detection of the second synchronization sequence fails, improving time synchronization efficiency.

In an S704 part of the method 700, that the master node sends second information to the slave node, or correspondingly, the slave node receives the second information from the master node includes: When the master node successfully detects the second synchronization sequence, the master node sends the second information to the slave node, and correspondingly, the slave node receives the second information from the master node. The method further includes: When the master node fails to detect the second synchronization sequence, the master node sends the second primary synchronization information to the slave node, where the second primary synchronization information is used to indicate that the master node fails to detect the second synchronization sequence, and correspondingly, the slave node receives the second primary synchronization information from the master node.

In this embodiment, when the master node fails to detect the second synchronization sequence, the master node sends the second primary synchronization information to the slave node, to indicate that detection of the second synchronization sequence fails. Therefore, a protection mechanism exists when detection of the second synchronization sequence fails, so that the slave node discards invalid data, thereby improving time synchronization efficiency.

Figure 8:
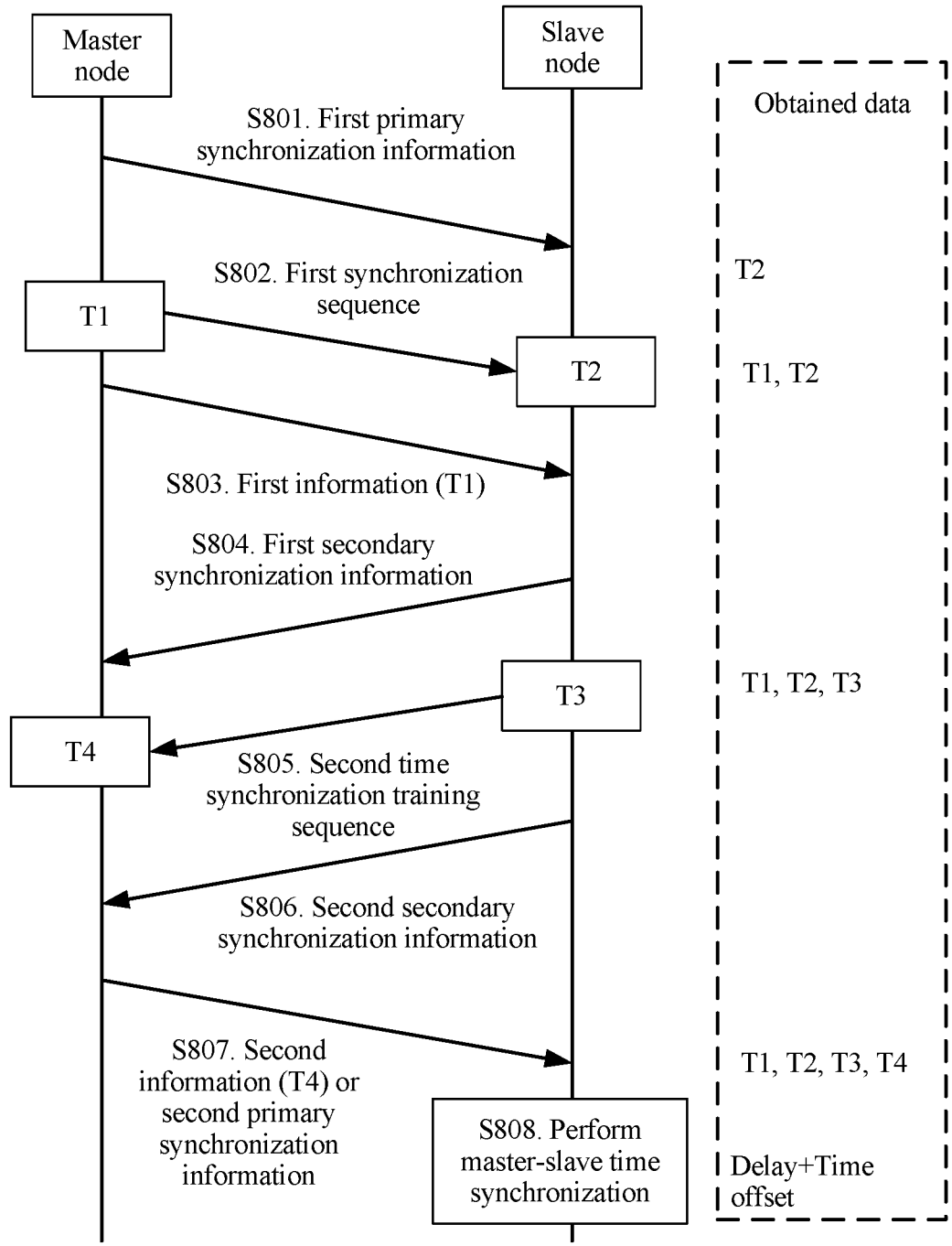
FIG. 8 is a schematic flowchart of a time synchronization method according to another embodiment of this application.

The following describes one example embodiment in accordance with the disclosure with reference to FIG. 8. FIG. 8 is a schematic diagram of a specific process of a time synchronization request. As shown in FIG. 8, a method 800 includes the following steps.

S801. A master node sends first primary synchronization information to a slave node, and correspondingly, the slave node receives the first primary synchronization information.

For a function and definition of the first primary synchronization information, refer to related descriptions in FIG. 7, and details are not described herein again.

In some embodiments, after receiving the first primary synchronization information, the slave node may start correlation peak detection of a first synchronization sequence.

In some embodiments, an oSTPA of the master node may send the first primary synchronization information, and after receiving the first primary synchronization information, an oSTPA of the slave node triggers correlation peak detection of the first synchronization sequence.

S802. The master node sends a first synchronization sequence to the slave node, and records a moment T1 of sending the first synchronization sequence, and correspondingly, the slave node receives the first synchronization sequence from the master node, and records a moment T2 of receiving the first synchronization sequence.

In some embodiments, the master node may insert the first synchronization sequence into a to-be-sent first signal, and the slave node may detect the first synchronization sequence by using a correlation peak detection function.

For example implementation of inserting, by the master node, the first synchronization sequence into an encoded codeword corresponding to the first signal and a specific process of detecting the first time synchronization training by the slave node, refer to related descriptions in FIG. 4 to FIG. 7, and details are not described herein again.

S803. The master node sends first information to the slave node, where the first information is used to indicate the moment T1, and correspondingly, the slave node receives the first information, and obtains the moment T1.

In some embodiments, the first information may be carried in a packet.

In some embodiments, if the slave node still detects no first synchronization sequence after receiving the first information, it indicates that the slave node fails to detect the first synchronization sequence. Therefore, the slave node considers the moment T1 indicated by the first information as invalid data, and discards a current round of a time synchronization operation.

S804. The slave node sends first secondary synchronization information to the master node, and correspondingly, the master node receives the first secondary synchronization information.

For a function and definition of the first secondary synchronization information, refer to related descriptions in FIG. 7, and details are not described herein again.

In some embodiments, after receiving the first secondary synchronization information, the master node may start correlation peak detection of a second synchronization sequence.

S805. The slave node sends a second synchronization sequence to the master node, and records a sending moment T3, and correspondingly, the master node receives the second synchronization sequence, and records a receiving moment T4.

In some embodiments, the slave node may insert the second synchronization sequence into a to-be-sent second signal, and the master node may detect the second synchronization sequence by using a correlation peak detection function.

For example implementation of inserting, by the slave node, the second synchronization sequence into an encoded codeword corresponding to the second signal and a specific process of detecting the second time synchronization training by the master node, refer to related descriptions in FIG. 4 to FIG. 7, and details are not described herein again.

S806. After sending the second synchronization sequence, the slave node sends second secondary synchronization information to the master node, and correspondingly, the master node receives the second secondary synchronization information.

In some embodiments, if the master node still detects no second synchronization sequence after receiving the second secondary synchronization information, it indicates that the master node fails to detect the second synchronization sequence.

S807. If the master node successfully detects the second synchronization sequence, the master node sends second information to the slave node; or if the master node fails to detect the second time synchronization training, the master node sends second primary synchronization information to the slave node; and correspondingly, the slave node receives the second information, or the slave node receives the second primary synchronization information.

The second information is used to indicate the moment T4.

In some embodiments, the primary synchronization response message may be used to indicate, to the slave node, that detection of the second synchronization sequence fails. After receiving the second primary synchronization information, the slave node may consider T3 as invalid data.

S808. The slave node calculates a delay and a time offset between the master node and the slave node based on T1 to T4, for time synchronization between the master node and the slave node.

In this embodiment, time synchronization is performed between the master node and the slave node by sending the first synchronization sequence and the second synchronization sequence, and the moments T2 and T4 of receiving the synchronization sequences are determined when the synchronization sequences are in quantized forms. Therefore, in the foregoing time intervals, or in other words, in an interval from T1 to T2 and an interval from T3 to T4, relatively few types of signal processing are performed on the synchronization sequences, so that delay uncertainty caused by different signal processing can be reduced, thereby improving precision of time synchronization.

Further, the master node sends the first primary synchronization information to the slave node, to instruct the slave node to trigger detection of the first synchronization sequence, so that the slave node may perform detection in the time window, instead of continuously performing detection, thereby improving efficiency of detecting the first synchronization sequence.

The time synchronization method and apparatus in the embodiments of this application are described above in detail with reference to FIG. 1 to FIG. 8, and the following continues to describe an apparatus according to an embodiment of this application with reference to the accompanying drawings.

Figure 9:
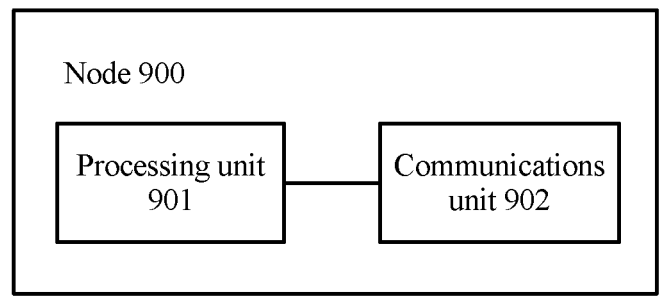
FIG. 9 is a schematic structural diagram of a node according to an embodiment of this application.

FIG. 9 is a schematic block diagram of a node 900 according to an embodiment of this application. It should be understood that the node 900 can perform steps that are performed by a slave node in FIG. 1 to FIG. 8. To avoid repetition, details are not described herein again. The node 900 includes a processing unit 901 and a communications unit 902. The processing unit 901 is configured to: receive a first signal from a master node by using the communications unit 902, where the first signal includes a first synchronization sequence; sample the first signal, to obtain a first sample; quantize the first sample, to obtain a quantized form of the first sample; detect the first synchronization sequence from the quantized form of the first sample, where a moment of detecting the first synchronization sequence is T2; receive first information from the master node by using the communications unit 902, where the first information is used to indicate a moment T1 at which the master node sends the first synchronization sequence; send a second synchronization sequence to the master node by using the communications unit 902, where a moment of sending the second synchronization sequence is T3; receive second information from the master node by using the communications unit 902, where the second information is used to indicate a moment T4 at which the master node detects a quantized form of the second synchronization sequence; and perform time synchronization between the slave node and the master node based on T1, T2, T3, and T4.

Figure 10:
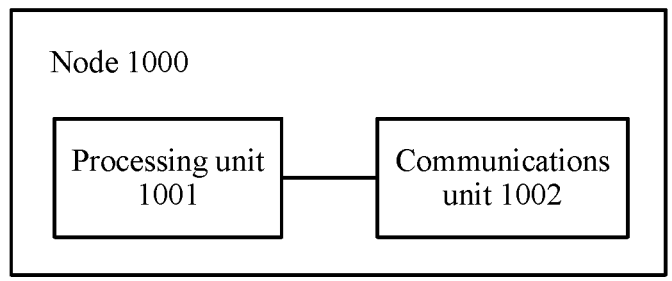
FIG. 10 is a schematic structural diagram of a node according to another embodiment of this application.

FIG. 10 is a schematic block diagram of a node 1000 according to an embodiment of this application. It should be understood that the node 1000 can perform steps that are performed by a master node in FIG. 1 to FIG. 8. To avoid repetition, details are not described herein again. The node 1000 includes a processing unit 1001 and a communications unit 1002. The processing unit 1001 is configured to send a first signal to a slave node by using the communications unit 1002, where the first signal includes a first synchronization sequence; send first information to the slave node by using the communications unit 1002, where the first information is used to indicate a moment T1 at which the master node sends the first synchronization sequence; receive a second signal from the slave node by using the communications unit 1002, where the second signal includes a second synchronization sequence; sample the second signal, to obtain a third sample; quantize the third sample, to obtain a quantized form of the third sample; detect the second synchronization sequence from the quantized form of the third sample, where a moment of detecting the second synchronization sequence is T4; and send second information to the slave node by using the communications unit 1002, where the second information is used to indicate T4, and T1 and T4 are used for time synchronization between the master node and the slave node.

Figure 11:
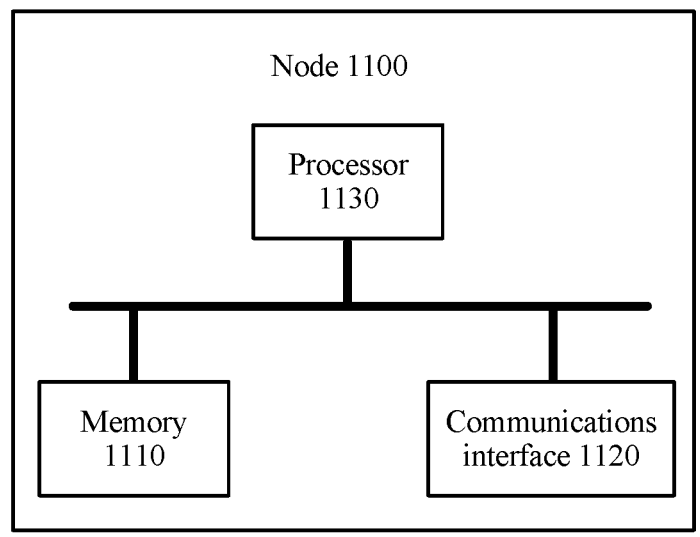
FIG. 11 is a schematic structural diagram of a node according to still another embodiment of this application.

FIG. 11 is a schematic structural diagram of a node 1100 according to an embodiment of this application. As shown in FIG. 11, the node 1100 includes one or more processors 1130, one or more memories 1110, and one or more communications interfaces 1120. The processor 1130 is configured to control the communications interface 1120 to receive and send signals, and the memory 1110 is configured to store a computer program. The processor 1130 is configured to invoke the computer program from the memory 1110, and run the computer program, so that the node 1100 performs a corresponding procedure and/or operation performed by a slave node in the time synchronization method embodiment in this application. For brevity, details are not described herein.

It should be noted that the node 900 shown in FIG. 9 may be implemented by the node 1100 shown in FIG. 11. For example, the communications unit 901 may be implemented by the communications interface 1120 in FIG. 11. The processing unit 901 may be implemented by the processor 1130.

Figure 12:
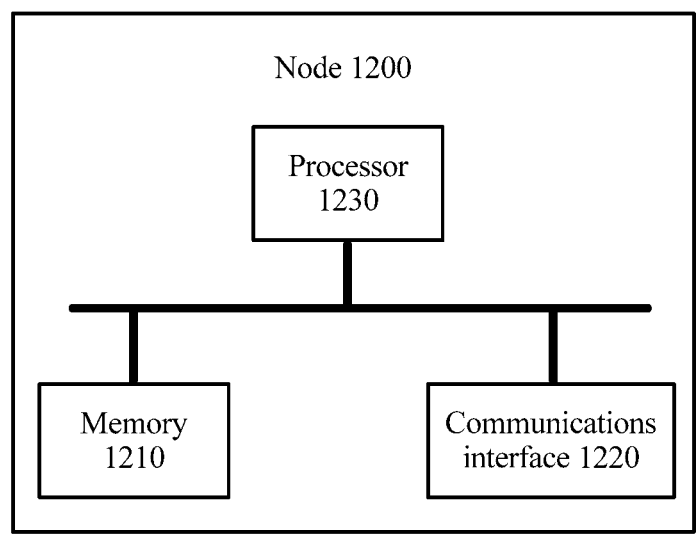
FIG. 12 is a schematic structural diagram of a node according to yet another embodiment of this application.

FIG. 12 is a schematic structural diagram of a node 1200 according to an embodiment of this application. As shown in FIG. 12, the node 1200 includes one or more processors 1230, one or more memories 1210, and one or more communications interfaces 1220. The processor 1230 is configured to control the communications interface 1220 to receive and send signals, and the memory 1210 is configured to store a computer program. The processor 1230 is configured to invoke the computer program from the memory 1210, and run the computer program, so that the node 1200 performs a corresponding procedure and/or operation performed by a master node in the time synchronization method embodiment in this application. For brevity, details are not described herein.

It should be noted that the node 1000 shown in FIG. 10 may be implemented by the node 1200 shown in FIG. 12. For example, the communications unit 1001 may be implemented by the communications interface 1220 in FIG. 12. The processing unit 1001 may be implemented by the processor 1230.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided herein, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A time synchronization method, comprising:
    receiving, by a slave node, a first signal from a master node, wherein the first signal comprises a first synchronization sequence and a third synchronization sequence, the first synchronization sequence and the third synchronization sequence separated by a first offset having a known size;
    sampling, by the slave node, the first signal, to obtain a first sample;
    quantizing, by the slave node, the first sample, to obtain a quantized form of the first sample;
    detecting, by the slave node, the first synchronization sequence from the quantized form of the first sample by detecting a first location associated with the third synchronization sequence and applying the first offset, wherein a moment of detecting the first synchronization sequence is T2;
    receiving, by the slave node, first information from the master node, wherein the first information indicates a moment T1 at which the master node sends the first synchronization sequence;
    sending, by the slave node, a second synchronization sequence to the master node, wherein a moment of sending the second synchronization sequence is T3;
    receiving, by the slave node, second information from the master node, wherein the second information indicates a moment T4 at which the master node detects a quantized form of the second synchronization sequence; and
    performing, by the slave node, time synchronization between the slave node and the master node based on T1, T2, T3, and T4.

2. The method according to claim 1, wherein detecting, by the slave node, the first synchronization sequence from the quantized form of the first sample comprises:
    performing, by the slave node, correlation peak detection of the first synchronization sequence on the quantized form of the first sample.

3. The method according to claim 1, wherein the third synchronization sequence is used for group synchronization, and the first offset exists between a first element of the third synchronization sequence and a first element of the first synchronization sequence; and
    detecting, by the slave node, the first synchronization sequence from the quantized form of the first sample comprises:
    determining, by the slave node, the first location, wherein the first location is a location of the first element of the third synchronization sequence in the quantized form of the first sample;
    determining, by the slave node, a second location based on the first location and the first offset, wherein the second location is a location of the first element of the first synchronization sequence in the quantized form of the first sample;
    obtaining, by the slave node, a quantized form of a second sample based on the second location, wherein the first sample comprises the second sample; and
    detecting, by the slave node, the first synchronization sequence from the quantized form of the second sample.

4. The method according to claim 3, wherein determining, by the slave node, a the first location comprises:
    performing, by the slave node, correlation peak detection of the third synchronization sequence on the quantized form of the first sample, to determine the first location; and
    detecting, by the slave node, the first synchronization sequence from the quantized form of the second sample comprises: performing, by the slave node, correlation peak detection of the first synchronization sequence on the quantized form of the second sample.

5. The method according to claim 1, wherein sending, by the slave node, the second synchronization sequence to the master node comprises:
    generating, by the slave node, an encoded codeword;
    inserting, by the slave node, the second synchronization sequence into the encoded codeword, wherein a moment of inserting the second synchronization sequence is T3;
    processing, by the slave node, the encoded codeword into which the second synchronization sequence is inserted, to generate a second signal; and
    sending, by the slave node, the second signal to the master node.

6. The method according to claim 5, wherein the method further comprises:
    inserting, by the slave node into the encoded codeword, a fourth synchronization sequence used for group synchronization, wherein a second offset exists between a first element of the fourth synchronization sequence and a first element of the second synchronization sequence.

7. A time synchronization method, comprising:
    sending, by a master node, a first signal to a slave node, wherein the first signal comprises a first synchronization sequence;
    sending, by the master node, first information to the slave node, wherein the first information indicates a moment T1 at which the master node sends the first synchronization sequence;
    receiving, by the master node, a second signal from the slave node, wherein the second signal comprises a second synchronization sequence and a fourth synchronization sequence, the second synchronization sequence and the fourth synchronization sequence separated by a second offset having a known size;
    sampling, by the master node, the second signal, to obtain a third sample;
    quantizing, by the master node, the third sample, to obtain a quantized form of the third sample;
    detecting, by the master node, the second synchronization sequence from the quantized form of the third sample by detecting a third location associated with the fourth synchronization sequence and applying the second offset, wherein a moment of detecting the second synchronization sequence is T4; and
    sending, by the master node, second information to the slave node, wherein the second information indicates T4, and T1 and T4 are used for time synchronization between the master node and the slave node.

8. The method according to claim 7, wherein detecting, by the master node, the second synchronization sequence from the quantized form of the third sample comprises:
performing, by the master node, correlation peak detection of the second synchronization sequence on the quantized form of the third sample.

9. The method according to claim 7, wherein the fourth synchronization sequence is used for group synchronization, and the second offset exists between a first element of the fourth synchronization sequence and a first element of the second synchronization sequence; and
detecting, by the master node, the second synchronization sequence from the quantized form of the third sample comprises:
determining, by the master node, the third location, wherein the third location is a location of the first element of the fourth synchronization sequence in the quantized form of the third sample;
determining, by the master node, a fourth location based on the third location and the second offset, wherein the fourth location is a location of the first element of the second synchronization sequence in the quantized form of the third sample;
obtaining, by the master node, a quantized form of a fourth sample based on the fourth location, wherein the third sample comprises the fourth sample; and
detecting, by the master node, the second synchronization sequence from the quantized form of the fourth sample.

10. The method according to claim 9, wherein determining, by the master node, the third location comprises:
performing, by the master node, correlation peak detection of the fourth synchronization sequence on the quantized form of the third sample, to determine the third location; and
detecting, by the master node, the second synchronization sequence from the quantized form of the fourth sample comprises: performing, by the master node, correlation peak detection of the second synchronization sequence on the quantized form of the fourth sample.

11. The method according to claim 7, wherein sending, by a master node, the first signal to a slave node comprises:
generating, by the master node, an encoded codeword;
inserting, by the master node, the first synchronization sequence into the encoded codeword, wherein a moment of inserting the first synchronization sequence is T1;
processing, by the master node, the encoded codeword into which the first synchronization sequence is inserted, to generate the first signal; and
sending, by the master node, the first signal to the slave node.

12. The method according to claim 11, wherein the method further comprises:
inserting, by the master node into the encoded codeword, a third synchronization sequence used for group synchronization, wherein a first offset exists between a first element of the third synchronization sequence and a first element of the first synchronization sequence.

13. A node, comprising:
a memory configured to store a computer program instruction; and
a processor coupled to the memory, wherein the computer program instruction causes the processor to be configured to:
receive a first signal from a master node, wherein the first signal comprises a first synchronization sequence and a third synchronization sequence, the first synchronization sequence and the third synchronization sequence separated by a first offset having a known size;
sample the first signal, to obtain a first sample;
quantize the first sample, to obtain a quantized form of the first sample;
detect the first synchronization sequence from the quantized form of the first sample by detecting a first location associated with the third synchronization sequence and applying the first offset, where a moment of detecting the first synchronization sequence is T2;
receive first information from the master node, wherein the first information indicates a moment T1 at which the master node sends the first synchronization sequence;
send a second synchronization sequence to the master node, wherein a moment of sending the second synchronization sequence is T3; and
receive second information from the master node, wherein the second information is used to indicate a moment T4 at which the master node detects a quantized form of the second synchronization sequence; and
perform time synchronization between the slave node and the master node based on T1, T2, T3, and T4.

14. The node according to claim 13, wherein the computer program instruction further causes the processor to be configured to:
perform correlation peak detection of the first synchronization sequence on the quantized form of the first sample.

15. The node according to claim 13, wherein the third synchronization sequence is used for group synchronization, and the first offset exists between a first element of the third synchronization sequence and a first element of the first synchronization sequence; and
wherein the computer program instruction further causes the processor to be configured to:
determine the first location, wherein the first location is a location of the first element of the third synchronization sequence in the quantized form of the first sample;
determine a second location based on the first location and the first offset, wherein the second location is a location of the first element of the first synchronization sequence in the quantized form of the first sample;
obtain a quantized form of a second sample based on the second location, wherein the first sample comprises the second sample; and
detect the first synchronization sequence from the quantized form of the second sample.

16. The node according to claim 15, wherein the computer program instruction further causes the processor to be configured to:
perform correlation peak detection of the third synchronization sequence on the quantized form of the first sample, to determine the first location; and
perform correlation peak detection of the first synchronization sequence on the quantized form of the second sample.

17. The node according to claim 13, wherein the computer program instruction further causes the processor to be configured to:
generate an encoded codeword;
insert the second synchronization sequence into the encoded codeword, wherein a moment of inserting the second synchronization sequence is T3;
process the encoded codeword into which the second synchronization sequence is inserted, to generate a second signal; and send, by the slave node, the second signal to the master node.

18. The node according to claim 17, wherein the computer program instruction further causes the processor to be configured to: insert a fourth synchronization sequence used for group synchronization, wherein a second offset exists between a first element of the fourth synchronization sequence and a first element of the second synchronization sequence.

* * * * *